United States Patent [19]

White et al.

[11] 4,262,195
[45] Apr. 14, 1981

[54] SOLAR TRACKING SYSTEM

[75] Inventors: Paul R. White, Huntsville; Donald R. Scott, Athens, both of Ala.

[73] Assignee: The United States of America as represented by the Administrator of the National Aeronautics and Space Administration, Washington, D.C.

[21] Appl. No.: 60,435

[22] Filed: Jul. 25, 1979

[51] Int. Cl.³ .............................. G01J 1/20
[52] U.S. Cl. .................. 250/203 R; 250/209
[58] Field of Search .............. 250/203 R, 209; 126/270, 271; 356/141, 152

[56] References Cited
U.S. PATENT DOCUMENTS
4,146,785  3/1979  Neale .................. 250/203 R Primary Examiner—David C. Nelms
Assistant Examiner—Darwin R. Hostetter
Attorney, Agent, or Firm—L. D. Wofford, Jr.; John R. Manning

[57] ABSTRACT

A solar tracker for a solar collector which is angularly oriented by a motor wherein the outputs of two side-by-side photodetectors are discriminated as to three ranges, a first corresponding to a low light or darkness condition; a second corresponding to light intensity lying in an intermediate range; and a third corresponding to light above an intermediate range, direct sunlight. The first output drives the motor to a selected maximum easterly angular position; the second enables the motor to be driven westerly at the earth rotational rate; and the third output, the separate outputs of the two photodetectors, differentially controls the direction of rotation of the motor to effect actual tracking of the sun.

7 Claims, 4 Drawing Figures

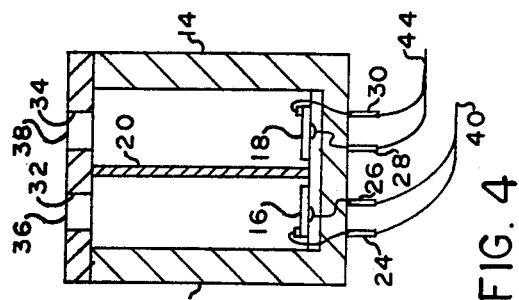
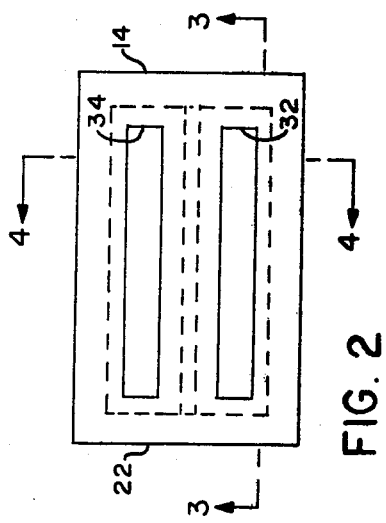
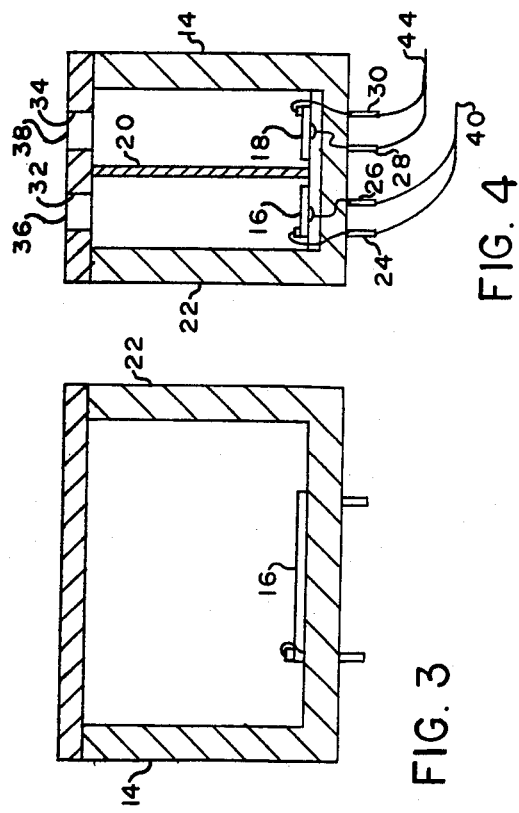

SOLAR TRACKING SYSTEM

ORIGIN OF THE INVENTION

The invention described herein was made by employees of the United States Government and may be manufactured and used by or for the Government of the United States for governmental purposes without the payment of any royalties thereon or therefor.

BACKGROUND OF THE INVENTION

1. Field of the Invention

This invention relates to photoelectric type solar tracking systems, and particularly to a system for maintaining a solar collector with its responsive surface normal to the sun as the sun traverses the sky from sunrise to sunset.

2. General Description of the Prior Art

Solar collectors, typically panels 18 to 24 inches in width and six to ten feet in length wherein either air or liquid is heated by the sun, are generally tilted along their length to the latitude of use. For improved efficiency, they should also have their responsive surface maintained normal to the sun's rays as the sun traverses the sky from east to west. This is particularly so, if not a must, with concentrating type collectors. Thus, it is well known to rotably mount a solar collector about a north-south axis and to by some means rotate it from east to west to follow the sun. Typically, such a means includes a pair of photocells mounted on the solar collector, one of which views the eastern quadrant (90°) of the horizon (when the collector and cells are positioned with their responsive area in a horizontal plane), and one of which views the western quadrant of the horizon. A difference in outputs between the cells indicates an error point at the sun, and thus the outputs of the cells may and are used to correctly position a collector. The applicants have found, however, that this capability alone is insufficient. Particularly they have observed that clouds, particularly a single bright cloud, can draw a photocell pointing away from pointing at the sun and causes a drive system to erroneously point a collector.

SUMMARY OF THE INVENTION

In accordance with this invention, the sun is observed by a photosensor consisting of two side-by-side photocells, each directly viewing the sky over a relatively small angle, e.g., 15°. One photocell effectively views easterly over this angle, and the other effectively views westerly over this angle. Outputs from the cells are differentially detected to effect tracking of the sun during periods when the output of each cell is of sufficient amplitude to indicate direct viewing of the sun unobscured by a cloud. When at least one of the cells is obscured by a cloud, means are provided to shift from a tracking mode to a pointing mode wherein the collector, and the sensor mounted on it, are rotated at the earth rotational rate. To enable starting each day with the collector correctly aimed at the sun at sunrise, darkness is sensed the evening before, and the collector is rotated to an anticipated selected sunrise angle of the sun.

BRIEF DESCRIPTION OF THE DRAWINGS

FIG. 2 is a top view of a solar cell assembly employed as a tracking sensor.

FIG. 3 is a sectional view along lines 3—3 of FIG. 2.

FIG. 4 is a sectional view along lines 4—4 of FIG. 2.

DESCRIPTION OF THE PREFERRED EMBODIMENT

Figure 1:
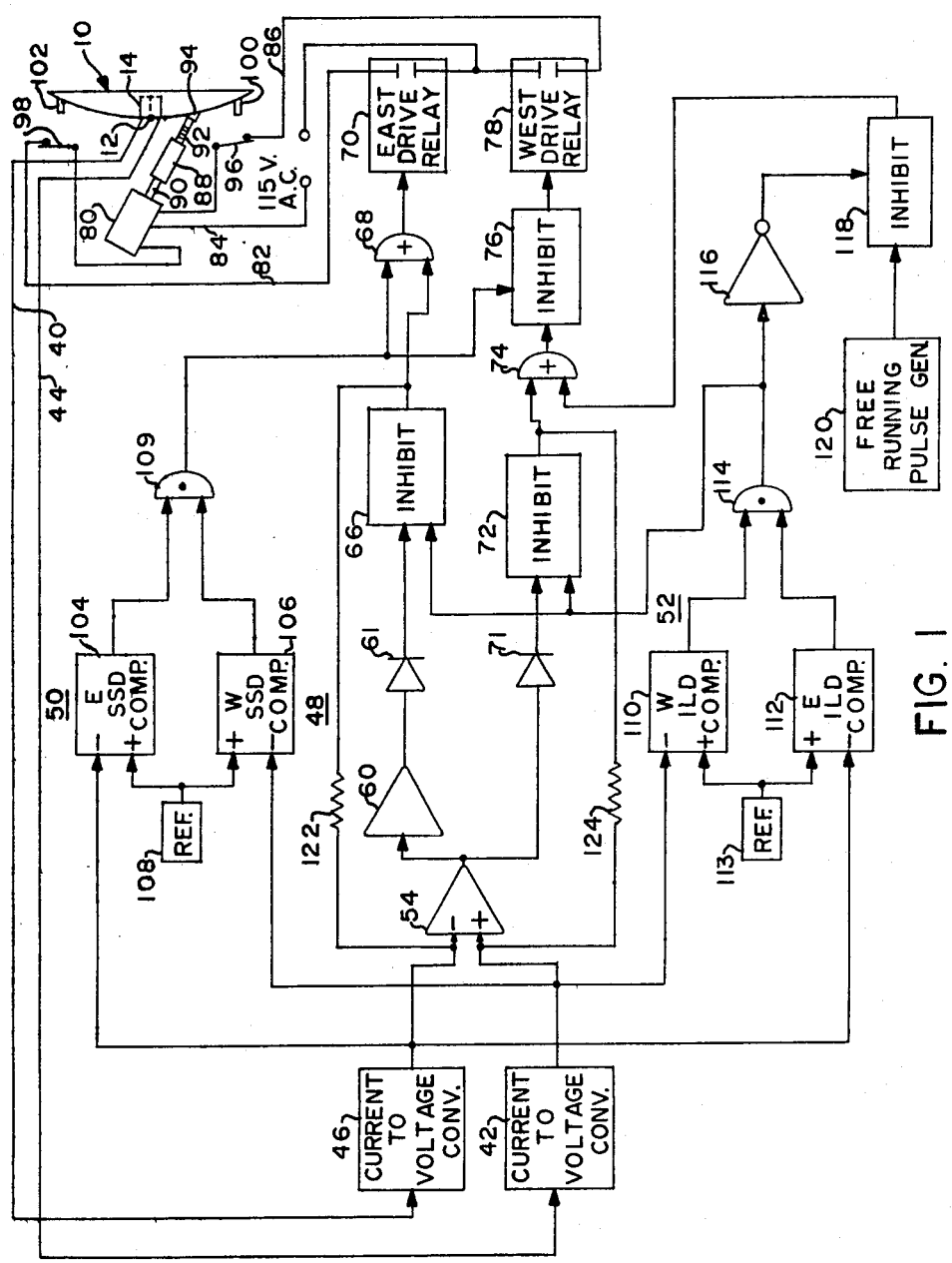
FIG. 1 is a schematic illustration of an embodiment of the invention.

Referring to FIG. 1, it is contemplated that this invention would have principal application with solar collectors, such as solar collector 10, which are mounted as by a pivot 12, with an axis along a north-south line so that the solar collector might be rotated about this axis to follow the sun as it progresses from each to west across the sky.

A sensor 14 is centrally mounted on solar collector 10, and thus it, too, is adapted to be rotated with the solar collector. Referring to FIGS. 2–4 a pair of like conventional silicon solar cells 16 and 18, having in this example a 1 cm by 0.5 cm responsive surface, are positioned on either side of opaque partition 20 in housing 22. Electrical terminals 24 and 26 from cell 16 extend through the bottom of housing 22, and electrical output terminals 28 and 30 from solar cell 18 extend similarly through housing 22. Light openings 32 and 34 enable selected exposure of solar cells 16 and 18 to the sun. Each of the light openings are sized and positioned so as to form acquisition and tracking apertures for the solar cells. Partition 20 lies along a plane coincident with the pivot or pivot axis 12 (FIG. 1) of solar collector 10; and thus when sensor 14 is aimed so that the plane of partition 20 bisects the sun, one-half of the area of each of the cells receives direct, not shadowed, rays from the sun. As shown, and with partition 20 lying along a vertical, north-south, plane, cell 18 is regarded as the east cell, and cell 16 is regarded as the west cell. Openings 32 and 34 are approximately 0.4 cm in width and 3 cm in length. The width determines the acquisition angle, and the length of each window is such to assure that a summer and winter sun will expose the full length of a cell. The cells are positioned approximately 2.3 cm from the inside edge of the openings or apertures. The wall thickness of each aperture is approximately 0.24 cm. Assuming that collector 10 is stationary, as the sun relatively moves westward, the exposed area of west cell 16 will increase, and the exposed area of east cell 18 will decrease simultaneously. This area change is directly proportional to the angular movement of the sun, and the arrangement of the cells in the circuitry is such that a linear electrical output is obtained from the cells up to a ±5° sun angle. Output signals from the cells are employed to effect tracking of the sun by collector 10, which is motor driven, as will be described.

The greatest angle required for acquisition of the sun will occur between the time the morning light passes through a daylight threshold and the time that flux intensity is high enough for acquisition and tracking to commence, as will be further described. This time can range from a few minutes where there is very clearly early morning light to an all day period where there is simply no direct sunlight. When there is no direct sunlight, collector 10 and sensor 14 are rotated at the earth rotational rate. When this does become necessary, the system accuracy is such that there will be created less than a 5° error in angle over a full day of operation. This allows for sun acquisition to take place, if necessary, at the end of a day. This error will be a function of the stability of the electrical components chosen and the winter-summer temperatures and their effect upon the repeatability of the power drive system which drives the collector and sensor.

The inside of housing 22 is black to increase the sensor selectivity to incident light. The outside of housing 22 is typically painted white in order to reflect the sun's heat to keep down the inside housing temperatures. Silicon cells are chosen for cells 16 and 18 because of their wide light bandwidth and their stability of operation in an environment of extreme temperature change. The cell size for cells 16 and 18, 1 cm by 0.5 cm, was chosen because of commercial availability of this size and because the electrical output of such sized cells is the greatest which is compatible with input limitations of a standard operational amplifier such as the LM741. Windows 36 and 38, of transparent material, are positioned over openings 32 and 34 of housing 22 in order to generally protect the cells and wiring from atmospheric contamination. The windows can be polarized or comprise infrared type filters where it is desired to increase the light wavelength selectivity of the cells. Of course, any cells whose voltage outputs are proportional to solar flux can also be used.

Scattered or non-directional light raises the level of the sensor outputs but should not be used in directional determinations. In the case of the present system, the magnitude of light is used to determine whether a tracking or pointing (at the earth rotational rate) mode of operation is used, and it is important that scattered light be kept to a minimum. This is assisted by the small apertures of the openings which reduce scattered light from bright nearby clouds.

Output terminals 24 and 26 from cell 16 connect to cable 40 which connects as an input to west cell current to voltage converter 42 (FIG. 1), and terminals 28 and 30 connect to cable 44 which feeds east cell current to voltage converter 46. Converters 42 and 46 also include low pass filters which function to reduce noise frequencies. The solar cell outputs of converters 42 and 46 are supplied to three control circuits, tracking control circuit 48, east return control circuit 50, and pointing control circuit 52.

With respect to tracking control circuit 48, the output of converter 46 is applied to the inverting input of operational amplifier 54, and the output of converter 42 is connected to the non-inverting input of amplifier 54. Amplifier 54 functions as a linear differential tracking amplifier. Thus, its output varies in sign and amplitude in accordance with the algebraic sum of its inputs. One output of amplifier 54, which will appear finite and negative when the higher input to amplifier 54 is from east solar cell 18, is applied to and inverted in inverting amplifier or analog inverter 60. The output of analog inverter 60 is fed through positive-pass diode 61 and inhibitor 66 (when not inhibited) to one input of OR gate 68, thence to east drive relay 70. A second output of amplifier 54, a positive output, occurs when the output from west solar cell 16 is greater than from east solar cell 16. It is fed through positive-pass diode 71 and inhibitor 72 (when not inhibited), then through OR gate 74, and then to a second inhibitor 76. When not inhibited, an output from inhibitor 76 is fed to west drive relay 78. Diodes 61 and 71 enable an appropriate signal conversion from a differential output of operational amplifier 54 to positive operating logic circuitry.

Assuming that no inhibiting signals are applied to inhibitors 66, 72 and 76, and one of the outputs of solar cells 16 and 18 is greater than the other, a turn-on signal will be applied to one of the drive relays.

Actual mechanical drive of solar collector 10 and of sensor 14 is effected by reversible motor 80 which is driven by one or the other of the drive relays. Motor 80 is powered by a 110-volt AC source through normally open contacts of the drive relays and leads 82, 84 and 86. When operated in a tracking mode wherein the drive relays are operated from signals from amplifier 54, motor 80 is driven in a direction which will produce a balanced output, which will occur when sensor 14 is correctly pointed at the sum.

As one form of motor drive of solar collector 10 and sensor 14, a threaded sleeve 88 is attached to shaft 90 of motor 80, and it in turn engages threaded rod 92, pivotally connected at point 94 to solar collector 10. Solar collector 10 rotates as described on a north-south axis indicated by pivot 12.

In order to limit the excursion of angular operation of solar collector 10, there is provided a normally closed east limit switch 96 and west limit switch 98 connected in series with the outputs of east drive relay 70 and west drive relay 78, respectively. Thus, when solar collector 10 is driven angularly to the east to a point where operating arm 100 engages limit switch 96, limit switch 96 will open; and when collector 10 is driven angularly to the west to a point where arm 102 engages limit switch 98, then switch 98 is opened. The east limit switch is adjusted for a selected sunrise angle of the collector, and the west limit switch is adjusted to simply prevent drive beyond the capabilities of the drive system.

East return control circuit 50 provides means for driving motor 80 to rotate solar collector 10 to a selected sunrise angle. This is accomplished the evening before sunrise by sensing dusk. Control circuit 50 employs an east sunset comparator 104 and west sunset comparator 106, being separately driven by outputs from converters 46 and 42, respectively. The comparators are amplifiers biased to produce a low output with a signal input resulting from a light condition above a selected level (above dusk light level) and a high output when the signal is lower, indicating a dark or dusk light condition. The reference level of the comparators is provided by a reference bias source 108. As shown, the outputs of comparators 104 and 106 are fed to AND gate 109 so that there will be a high output from AND gate 109 only when both of the solar cell signals are high, positively indicating a general condition of low light, dusk or dark. The high or night indicating output of AND gate 109 is fed through OR gate 68 to power east drive relay 70 to cause it to turn on motor 80 and drive solar collector 10 in an easterly direction until motor 80 is turned off by the operation of limit switch 96. The high output of AND gate 109 is also applied to inhibitor 76, which operates to block any signal flow to west drive relay 78 when the output of AND gate 109 is high. Otherwise, and during sunlight, inhibitor 76 does not block signal flow. Thus, each night collector 10 is effectively operated to be aimed at the sun and thus ready for sunrise the next morning.

As described in the discussion of the Background of the Invention, a well known problem with solar tracking drives is that unless the sun is pretty much directly viewable, signals derived from photoelectric or solar cell scanners may not correctly indicate the angle of the sun. The present invention takes this into account, and thus by means of pointing control circuit 52, cloudy conditions are detected and a constant rate (rotation rate of each drive operation) is substituted for the actual tracking type drive operation described above. Pointing control circuit 52 employs west intermediate light (ILD) comparator 110 and east intermediate light (ILD) comparator 112 driven, respectively, from outputs from converters 42 and 46. Comparators 110 and 112 are amplifiers which are biased to provide a low output for light levels of at least a selected value, that is, anticipated from direct sunlight and otherwise to provide a high output. Reference bias 113 provides a bias level to comparators 110 and 112 to effect this. The outputs of comparators 110 and 112 are applied to AND gate 114, and as a result, the output of AND gate 114 goes high when either of comparators 110 and 112 fails to detect a direct sunlight condition. Such high output of AND gate 114 operates inhibitors 66 and 72 to thus block tracking signal flow from tracking amplifier 54 to the drive relays. At the same time, that is, with less than direct sunlight, the high output from AND gate 114 is inverted by inverter 116 to become low, and as such, inhibitor 118 is no longer inhibited; and this enables a drive signal from free running pulse generator 120 to be applied through OR gate 74 to west drive relay 78. Pulse generator 120 provides constant width pulses at a constant rate such that west drive relay 78 is operated on for such periods as to generally effect an earth rotation rate, westerly rotation, of collector 10 by motor 80. This rate is 0.025° per minute. By this means, collector 10 follows or points at the sun when at least one of photocells 16 and 18 does not directly view the sun.

When the sun clearly appears to solar cells 16 and 18, there will occur an increased level of signal to comparators 110 and 112 (greater than from reference 113), and the outputs from these comparators will go low. As a result, the output of AND gate 114 will go low, and inhibitors 66 and 72 will be disabled, enabling signal flow from tracking amplifier 54 to east and west drive relays 70 and 78, and thus there will be resumed a normal tracking mode of operation. This is enabled by the low signal being converted to a high signal by inverter 116 and applied to inhibitor 118 which thereafter blocks signal flow from pulse generator 120 to west drive relay 78.

Tracking will continue unless such operation is interrupted by clouds which would be sensed by a decreased level of signal fed to at least one of comparators 110 and 112, causing operation to revert to a constant rate drive operation as controlled by pulse generator 120.

At nightfall, or sunset, sunset comparators 104 and 106 will sense a low light level, their outputs will go high, and the output of AND gate 109 will provide an inhibiting signal to inhibitor 76 which will stop any westward signal input from being applied to west drive relay 78. At the same time, the high output signal from AND gate 109 will be applied through OR gate 68 to east drive relay 70, which will then cause motor 80 to be driven in a direction to rotate solar collector 10 eastward until stopped by limit switch 96. At this point, the collector will be ready aimed to receive the sun at sunrise the next morning.

While in a tracking mode, motor drive actually occurs at pulsed intervals corresponding to periods of error signal. The circuit is designed for a pulse duration to reduce an error voltage (the sum of input voltages) detected by amplifier 54 to zero and consequently achieve a zero sun angle error. The off-time, which is a function of light intensity, represents the time it takes the sun to move approximately 0.025° and is about one minute. Hysteresis is provided by a positive feedback loop from the outputs of inhibitors 66 and 72 and through, respectively, feedback resistors 122 and 124 to the separate inputs of amplifier 54. This optimizes the motor on-off time to prevent frequency on-off cycling and unnecessary wear on the motor.

Since the comparators employed compare the light levels of both cells simultaneously, the system discriminates against following a bright cloud seen only by one solar cell. If this should occur, the light from the cloud will most probably be less than the threshold level of comparators 110 and 112 which will cause the system to instantly change from a tracking to a pointing mode. In a point mode, the motor is, as stated above, time pulses to effect a westward drive on solar collector 10 at the earth rate until both cells directly view the sun.

From the foregoing, it will be appreciated that the present invention comprehensively deals with all sky conditions likely to be met and provides a system which will operate unattended with accuracy and dependability.

We claim:

1. A solar tracker for and commonly mounted with a solar collector comprising:

first and second photodetectors mounted together and oriented to receive equal quantities of light when a center line separating the photodetectors is aimed at the sun;

a reversible motor and mechanical drive means coupling said motor to said photodetectors for varying the angle of view of said photodetectors and solar collectors easterly and westerly with respect to the sun;

first electrical drive means for driving said motor in a first direction;

second electrical drive means for driving said motor in an opposite direction;

first signal means responsive to a lower than a first selected level output of said photodetectors for providing an input to said first electrical drive means until said photodetectors are oriented at a selected easterly angular position;

second signal means responsive to an electrical output level of each of said photodetectors which is greater than said first selected level, and the output level of at least one of said photodetectors is less than a second and selected higher level for applying an input to said second drive means for driving said motor for rotation of said photodetectors at an earth rate rotation in a westerly direction;

third signal means responsive to a signal value output from each of said photodetectors which is greater than said second selected value for inhibiting said second signal means and responsive to combined outputs of both of said photodetectors for, alternately, providing either a signal to said first drive means or second drive means, depending upon which of said photodetectors is providing the higher output;

whereby upon the occurrence of darkness, said photodetectors are driven to a selected eastern angular position to await sunrise;

upon the occurrence of daylight which is less than full sunlight either just before sunrise over the terrain or during periods when the sun is obscured by clouds, the photodetectors are oriented at an angular rate as if they were tracking the sun; and upon the appearance of the sun, the photodetectors are oriented by actual tracking of the sun and thereby the solar collector commonly mounted with said photodetectors.

2. A solar tracker as set forth in claim 1 wherein an enclosure separately encloses each said photodetector, and each enclosure has a light aperture through which a said photodetector is exposed to the sun.

3. A solar tracker as set forth in claim 2 wherein:
each said light aperture is rectangular, having a length, or long dimension, generally extending north and south, and a width, or short dimension, generally extending east and west; and
each said photodetector being similarly rectangular and having a photoresponsive surface in a plane generally parallel with a said aperture and spaced from a said aperture.

4. A solar tracker as set froth in claim 3 wherein the relative positions of said apertures and widths of each said aperture are selected so that when said center line separating said photodetectors is aimed at the sun, one-half of the responsive area of each cell receives direct sunlight through an aperture.

5. A solar tracker as set forth in claim 4 wherein the length of each aperture is such that the sun will fully expose the length of a photodetector in winter and summer for the latitude of use.

6. A solar tracker as set forth in claim 5 wherein the width dimension of a said responsive area of a said photodetector is approximately 0.5 cm, the length dimension of a photoresponsive area is approximately 1 cm, the width dimension of a said aperture is approximately 0.4 cm, the length dimension of a said aperture is approximately 3 cm, and the spacing from an aperture to a said responsive area of a said cell is approximately 2.3 cm.

7. A solar tracker as set forth in claim 5 wherein said photodetectors are current generating solar cells.

* * * * *